(12) United States Patent
Matsunaga et al.

(10) Patent No.: US 6,680,550 B2
(45) Date of Patent: Jan. 20, 2004

(54) HERMETIC MOTOR-DRIVEN COMPRESSOR

(75) Inventors: Hiroshi Matsunaga, Kusatsu (JP); Manabu Sakai, Kusatsu (JP); Takeshi Hashimoto, Shiga (JP); Hideyuki Kanzaki, Moriyama (JP); Yoshihiko Wakasa, Shiga (JP); Tetsushi Funatsu, Takefu (JP)

(73) Assignee: Matsushita Electric Industrial Co., Ltd. (JP)

( * ) Notice: Subject to any disclaimer, the term of this patent is extended or adjusted under 35 U.S.C. 154(b) by 39 days.

(21) Appl. No.: 10/046,655

(22) Filed: Jan. 14, 2002

(65) Prior Publication Data

US 2002/0109420 A1 Aug. 15, 2002

(30) Foreign Application Priority Data

Jan. 15, 2001 (JP) ........................................ 2001-006048

(51) Int. Cl.$^7$ ................................................. H02K 1/20
(52) U.S. Cl. ............................. 310/58; 310/59; 310/61; 310/60 A; 310/52; 310/54; 310/60 R
(58) Field of Search ................................ 310/58–59, 61, 310/60 R, 60 A, 216, 261, 264, 52, 54–55; 29/596, 598

(56) References Cited

U.S. PATENT DOCUMENTS

| 2,508,207 | A | * | 5/1950 | Woll et al. ................. 310/58 |
| 3,663,127 | A | * | 5/1972 | Cheers ..................... 417/372 |
| 4,912,350 | A | * | 3/1990 | Parshall et al. ........... 310/217 |
| 5,173,629 | A | * | 12/1992 | Peters ..................... 310/216 |
| 5,365,132 | A | * | 11/1994 | Hann et al. ............... 310/58 |
| 5,970,600 | A | * | 10/1999 | Huang et al. ............. 29/596 |
| 6,020,667 | A | * | 2/2000 | Carey et al. .............. 310/216 |
| 6,174,149 | B1 | * | 1/2001 | Bush ....................... 418/55.1 |
| 6,218,753 | B1 | * | 4/2001 | Asano et al. ............. 310/156 |
| 6,280,168 | B1 | * | 8/2001 | Matsumoto et al. ...... 418/151 |
| 6,413,061 | B1 | * | 7/2002 | Esumi et al. ............. 418/63 |

* cited by examiner

Primary Examiner—Nestor Ramirez
Assistant Examiner—Leda T. Pham
(74) Attorney, Agent, or Firm—Rossi & Associates

(57) ABSTRACT

In a hermetic motor-driven compressor, a first gas passage is formed by a space between a linear section in a motor stator and a hermetic container, and a second gas passage in parallel with the first gas passage is formed by through holes in the motor stator. The through holes constituting the second gas passage are disposed outside of a circle inscribed in the linear section in the stator. The through hole is shaped like a bow, and an arch shape of the outer periphery thereof has a curvature larger than that of the outer circumference of the stator.

3 Claims, 5 Drawing Sheets

HERMETIC MOTOR-DRIVEN COMPRESSOR

FIELD OF THE INVENTION

The present invention relates to a hermetic motor-driven compressor for use in an air conditioner, refrigerator, and the like.

BACKGROUND OF THE INVENTION

A hermetic motor-driven compressor for use in an air conditioner, refrigerator, and the like, is so structured that the coolant gas compressed by the compressing element is discharged within the hermetic container once together with the lubricant used for lubricating or sealing the sliding parts, and only the coolant gas is discharged outside after the lubricant is separated, in order to prevent the lubricant from flowing outside together with coolant and causing lubrication failure. Such kind of hermetic motor-driven compressor is described with reference to FIG. 3.

In FIG. 3, reference numeral 1 shows a hermetic container. Motor element 2 and compressing element 3 are housed at the top and bottom of the container, respectively. Motor element 2 comprises rotor 21 attached to rotating shaft 23, and stator 22 attached to the inside wall of hermetic container 1. Compressing element 3 comprises cylinder 31, rolling piston 32 rolled in cylinder 31 by the rotation of rotating shaft 23, vane 33 in contact with this rolling piston 32 for partitioning cylinder 31 into high-pressure and low-pressure chambers, and bearings 35 and 36 for closing the openings of cylinder 31. Reference numeral 24 shows a gas passage formed along the outer circumference of the stator. Together with the clearance formed between the stator and rotor, the gas passage 24 allows the passage of high-temperature and high-pressure coolant gas compressed by the compressing element, introduces the gas into space 5 provided at the top of hermetic container 1, and discharges the gas from discharge pipe 6 into the external cooling circuit. On the other hand, the lubricant discharged from the compressing element together with the coolant gas is separated from the coolant gas in top space 5, goes through the clearance between the rotor and stator and gas passage 24, and returns to lubricant reservoir 7 provided at the bottom of the hermetic container.

At this time, gas passage 24 should have a cross-sectional area as large as possible in order to minimize pressure loss, and moreover, pressure difference between top space 5 and bottom space 8 of the hermetic container, and to assist the lubricant in returning to lubricant reservoir 7 by its weight smoothly. For this purpose, a hermetic compressor described in Japanese Utility Model Laid-Open Publication No. H01-159559, for example, has gas passage 24a and gas passage 24b in a parallel arrangement, as shown in FIGS. 4 and 5. Gas passage 24a is formed of a space between a linear section along the outer circumferential surface of the motor element and the inside wall surface of the hermetic container, and gas passage 24b is formed of through holes concentrically arranged in the vicinity of the outer circumference of the motor element. The through hole constituting gas passage 24 is structured to have a V-shaped inner periphery that has an apex on the centerline of the teeth in the stator core and is directed toward the outer periphery as it goes away from the apex.

However, with the structure shown in FIGS. 4 and 5, the width of the stator core between gas passage 24b and the stator slot in which windings are wound is too small to have sufficient mechanical strength. Therefore, the structure has problems: the teeth of the stator core are distorted easily by the stress applied thereto when the stator is pressed into the hermetic container and the distortion of the stator core hinders the hermetic container and the stator core from having sufficient holding force.

SUMMARY OF THE INVENTION

To address the above-mentioned problems, the present invention provides a hermetic motor-driven compressor in which magnetic flux passages in the stator core are sufficiently secured, the stator core is not distorted by the stress applied thereto when pressed into the hermetic container, and holding force of the stator core and the hermetic container is ensured.

The hermetic motor-driven compressor in accordance with the present invention has a first gas passage formed of a space between a linear section along the outer circumferential surface of the motor element and the inside wall surface of the hermetic container, and a second gas passage formed of through holes concentrically arranged in the vicinity of the outer circumference of the motor element. The through holes are disposed outside of the smallest inscribed circle that is concentric with the motor element and inscribed in the linear sections. The through holes are shaped like a bow or semicircle. The outer periphery of the through hole is shaped like an arch that has a curvature larger than that of the outer circumference of the motor element. The inner periphery thereof is shaped like an arc that has a radius larger than that of the smallest inscribed circle or a line.

Such a structure enables to provide a high-performance hermetic motor-driven compressor with little lubricant leak in which magnetic passages in the stator core are sufficiently secured, the stator core is not distorted by the stress applied thereto when pressed into the hermetic container, and holding force of the stator core and the hermetic container is ensured.

DETAILED DESCRIPTION OF PREFERRED EMBODIMENT

Figure 3:
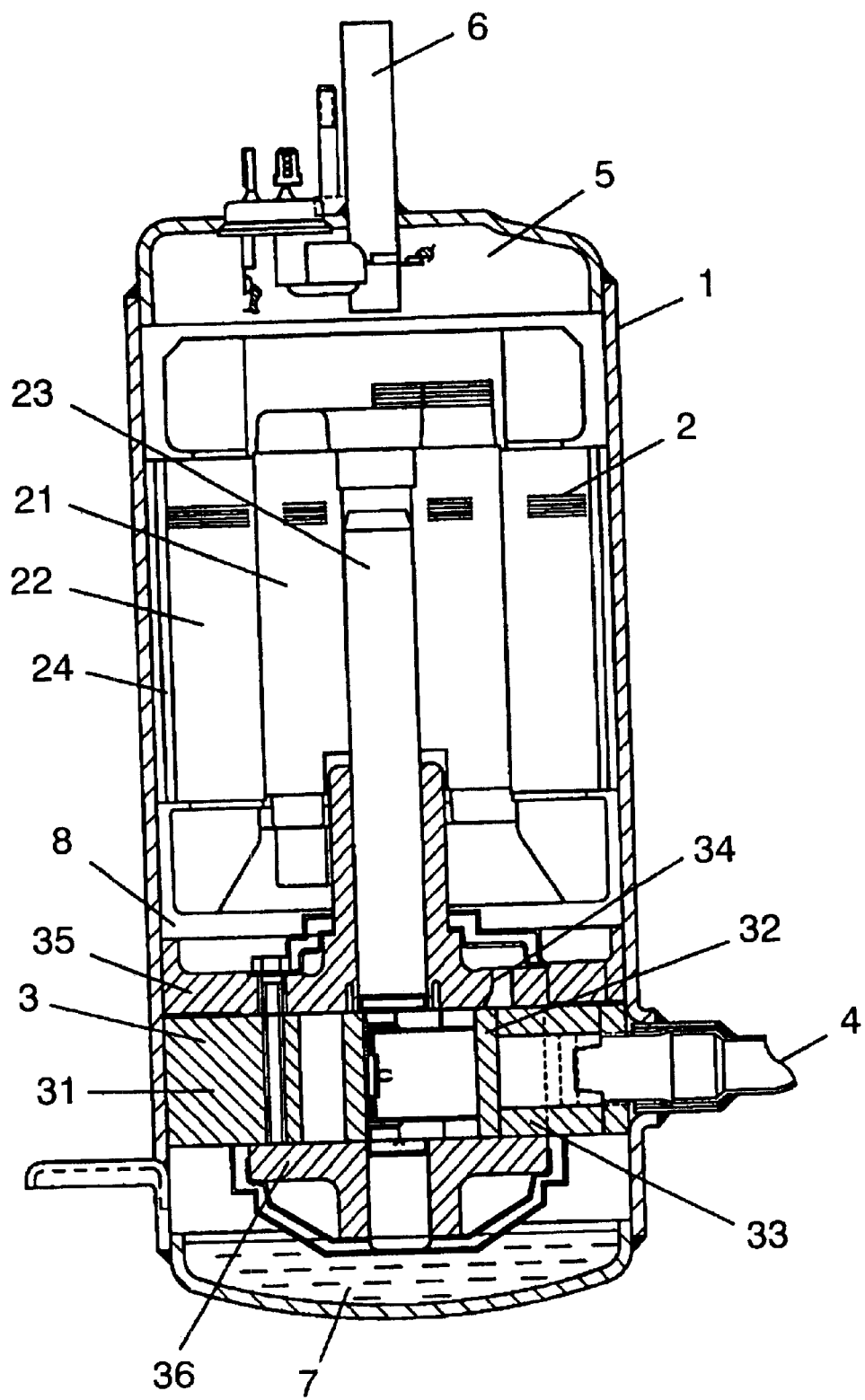
FIG. 3 is an axial cross section showing a structure of the hermetic motor-driven compressor.
Figure 4:
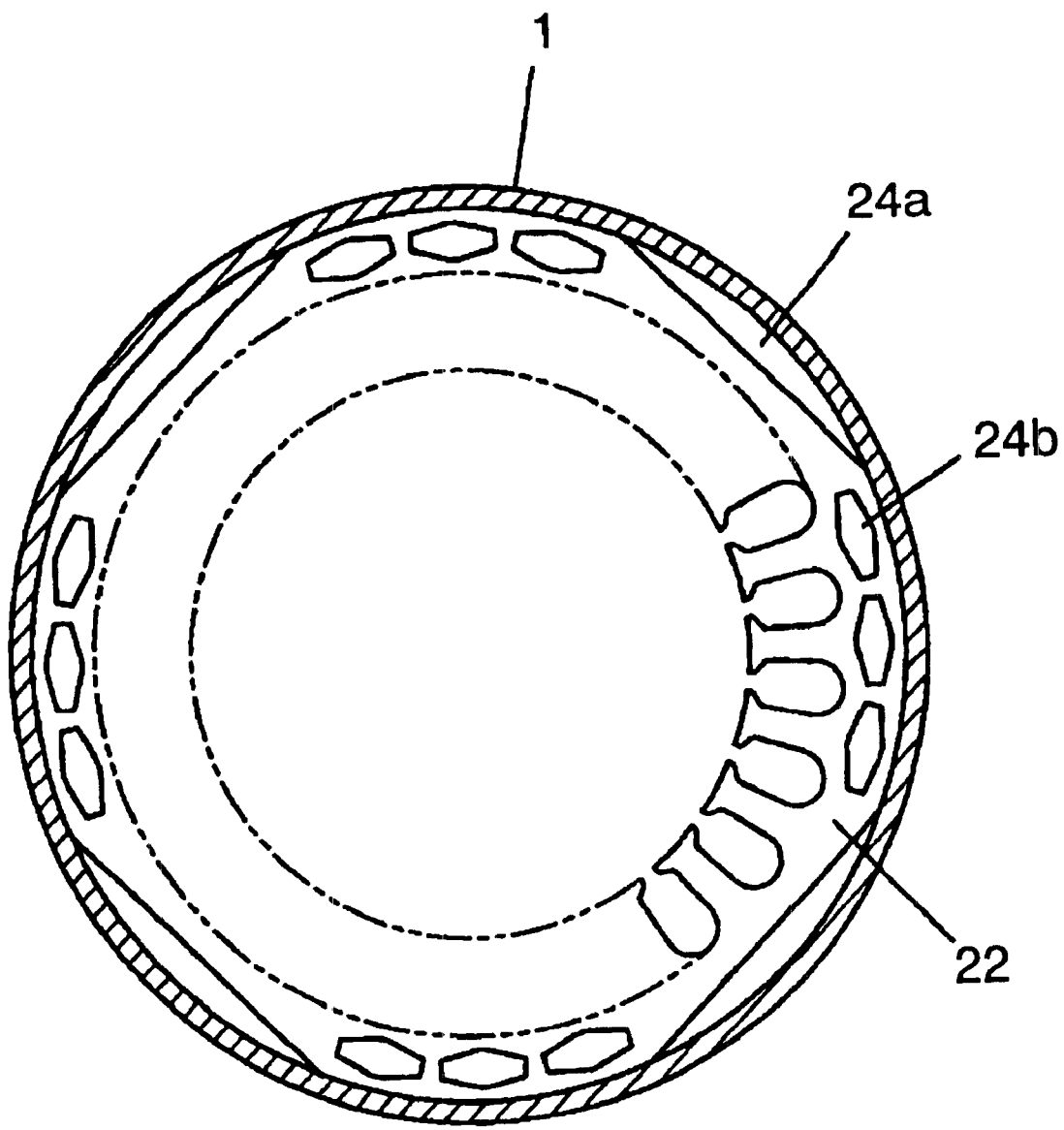
FIG. 4 a radial cross section of a motor element of a conventional hermetic motor-driven compressor.
Figure 5:
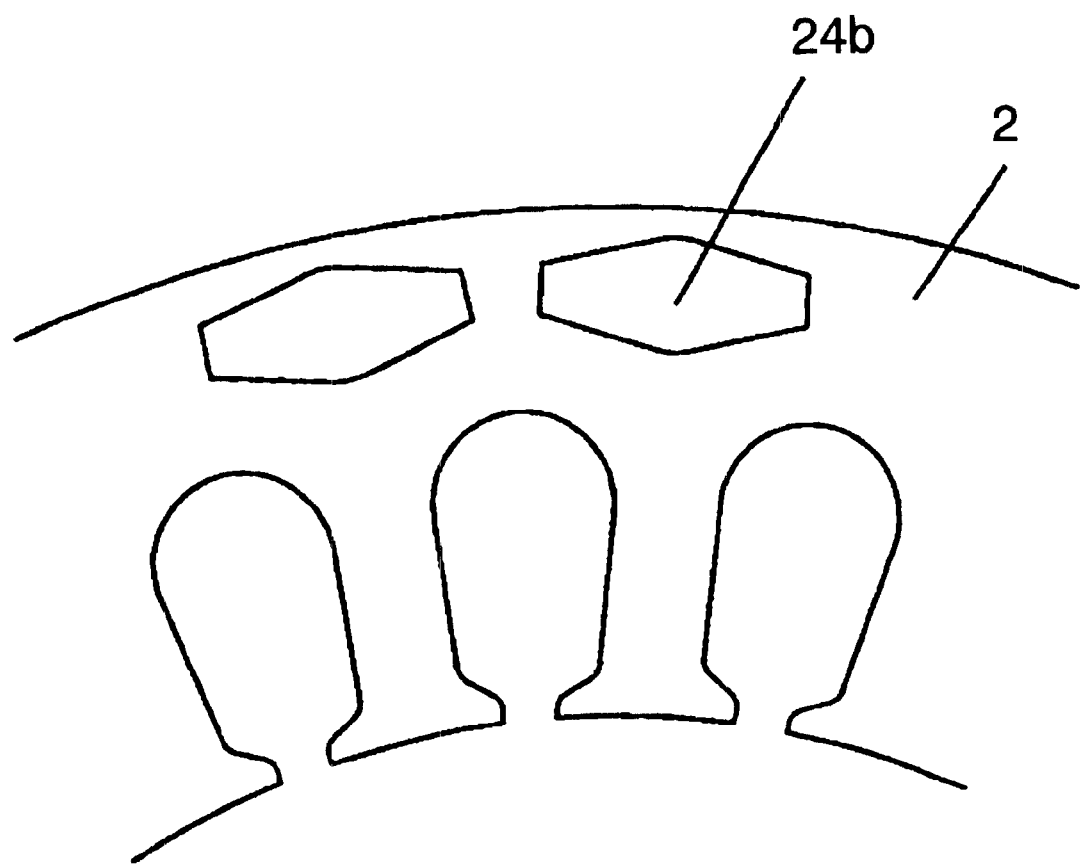
FIG. 5 is a partially enlarged view of the hermetic motor-driven compressor shown in FIG. 4.

In the hermetic motor-driven compressor in accordance with the present invention, a compressing element and a motor element for driving the compressing element are axially arranged and housed in a hermetic container (see FIG. 3). Compressed gas discharged from the compressing element within the hermetic container goes through a first gas passage and a second gas passage that are formed along the outer circumference of the motor element in a parallel arrangement and moves in the hermetic container and then flows out of the hermetic container.

Figure 1:
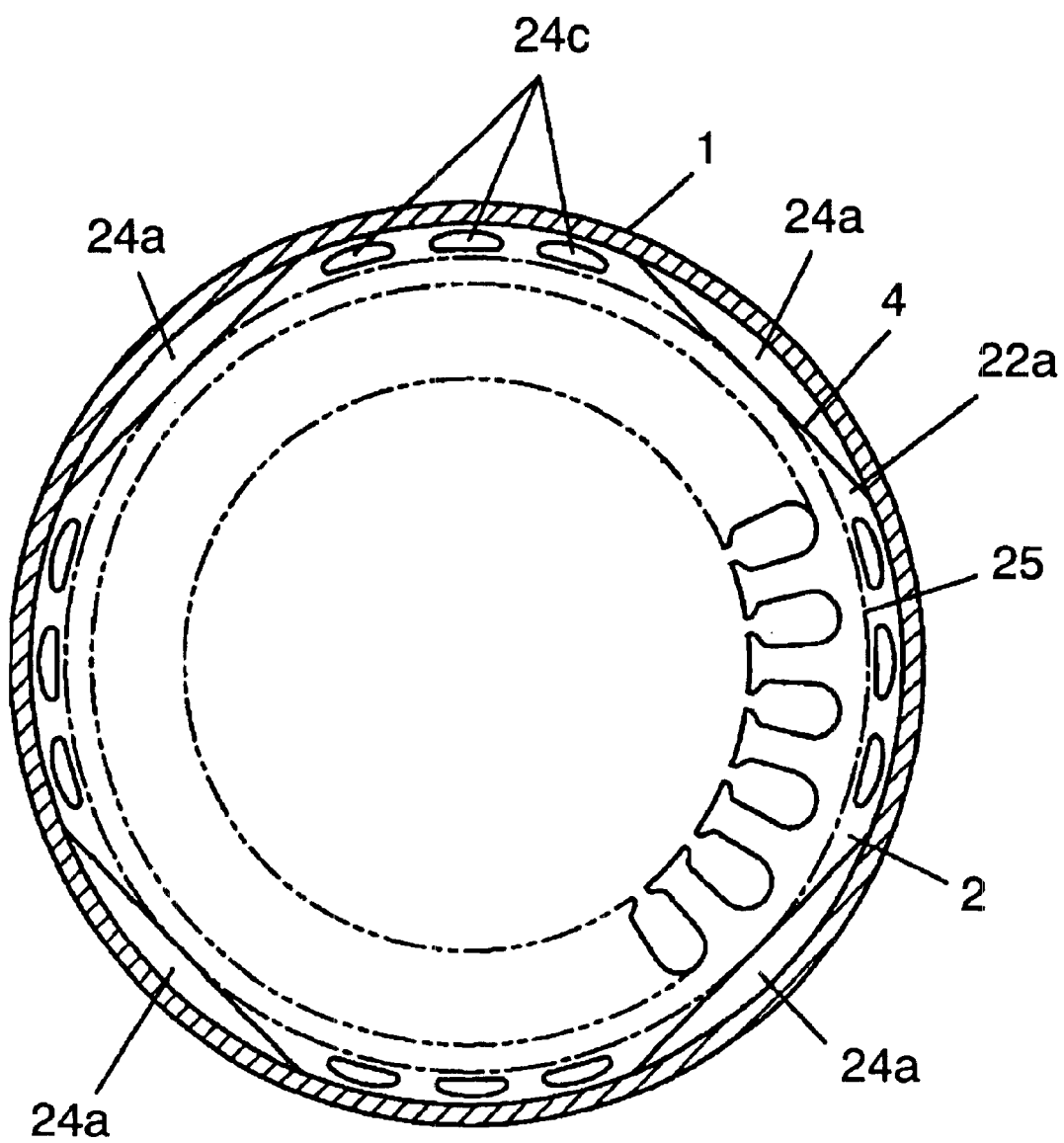
FIG. 1 is a radial cross section of a motor element of a hermetic motor-driven compressor in accordance with an exemplary embodiment of the present invention.
Figure 2:
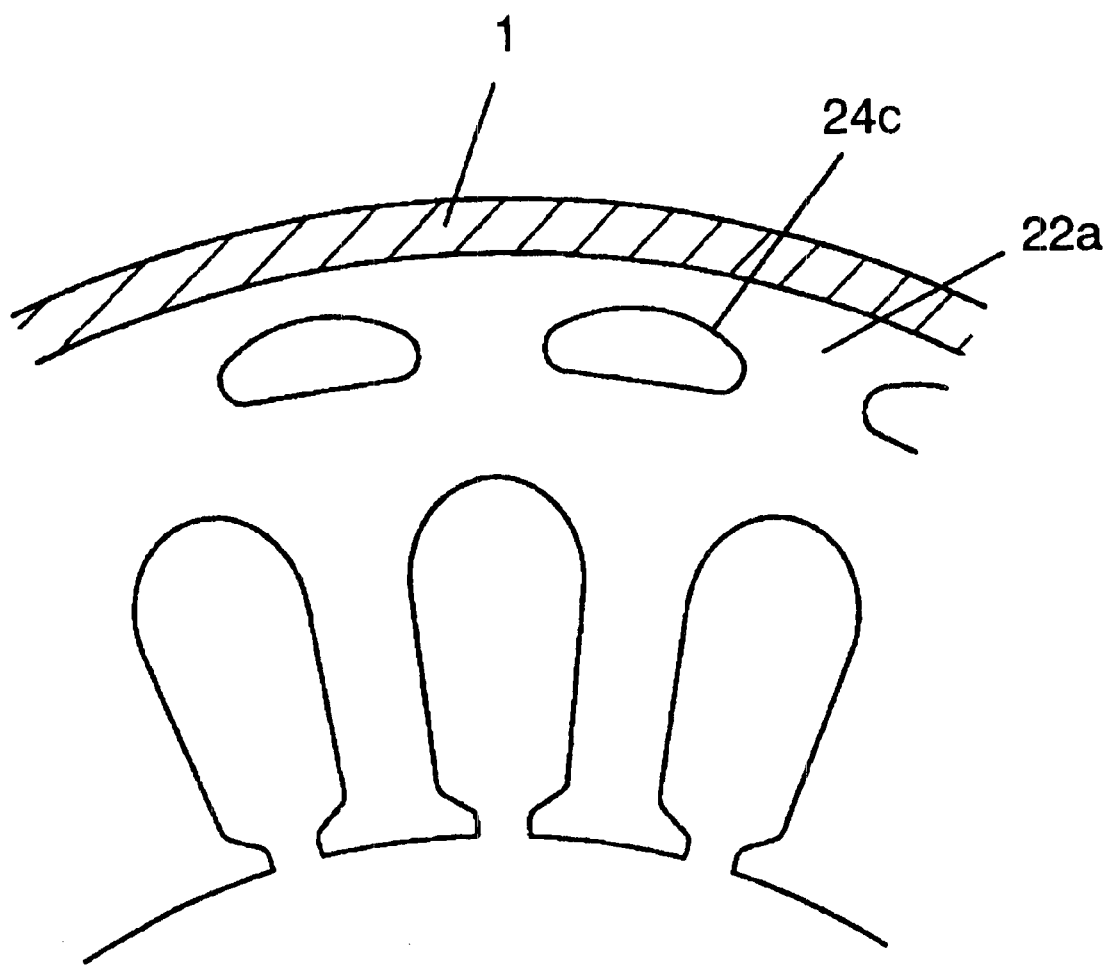
FIG. 2 is a partially enlarged view of the hermetic motor-driven compressor in accordance with the exemplary embodiment of the present invention.

FIG. 1 is a radial cross section of a motor element of a hermetic motor-driven compressor in accordance with an exemplary embodiment of the present invention; and FIG. 2 is a partially enlarged view thereof. In these drawings, reference numeral 1 shows a hermetic container and 22a shows a stator core. The stator core is made by punching a predetermined shape in a sheet of ion and laminating the punched cores. When a predetermined shape is punched in a sheet of iron, a part of the outer circumference is cut and a plurality of linear sections 4 are formed in order to utilize the sheet efficiently. In this embodiment, the space formed between the linear section 4 and the inside wall surface of the hermetic container constitutes first gas passage 24a.

Reference numeral 24c shows a second gas passage composed of through holes formed in the vicinity of the outer circumference of the motor element. As shown in FIG. 1, the through holes are disposed outside of inscribed circle 25 that is inscribed in a plurality of linear sections 4 and concentric with motor element 2 or hermetic container 1. When the plurality of linear sections are not the same size, a plurality of inscribed circles exist. In that case, the through holes are disposed outside of the smallest inscribed circle.

Magnetic flux flowing in the stator core when motor element 2 operates is restricted by the cross-sectional area of the narrowest portion in the stator core formed by the linear section. Thus, even when through holes constituting second gas passage 24c are provided outside of inscribed circle 25, the cross-sectional area of the portion having the though holes is not smaller than that of the narrowest portion formed by the linear section. Consequently, little influence is exercised on the characteristics of the motor element.

The through holes constituting second gas passage 24c are shaped like a bow. The outer periphery of the through hole is shaped like an arch that has a curvature larger than that of the outer circumference of the motor element. The inner periphery thereof is shaped like an arc that has a radius larger than that of the smallest inscribed circle or a line. Since the outer periphery of the through hole is shaped like an arch that has a curvature larger than that of the outer circumference of the motor element, the stress applied to stator core 22a when the core is pressed into hermetic container 1 is distributed along the arch shape. In addition, since the inner periphery of the through hole is shaped like an arc that has a radius larger than that of the smallest inscribed circle or a line, a sufficient size is secured between the stator slot in which windings are wound and the through hole. This can provide mechanical strength sufficient for the stator core to withstand the stress applied thereto when the stator core is pressed into the hermetic container. As a result, the stator core is not distorted when pressed into the hermetic container. Thus this structure exercises little influence on the characteristics of the motor element and can improve holding force of the stator and the hermetic container.

What is claimed is:

1. A hermetic motor-driven compressor comprising:
   a compressing element;
   a motor element for driving said compressing element, said motor element having at least one linear section formed along an outer circumferential surface thereof and at least one through hole disposed in the vicinity of the outer circumference;
   a substantially cylindrical hermetic container in which said compressing element and said motor element are axially arranged and housed;
   a first coolant gas passage formed by a space between said linear section along the circumferential surface of said motor element and an inside wall surface of said hermetic container, and allows passage of compressed coolant gas discharged from said compressing element within said hermetic container; and
   a second coolant gas passage formed parallel with said first coolant gas passage that allows passage of compressed coolant gas, said second coolant gas passage comprising the through hole in said motor element,
   wherein the through hole in said motor element constituting said second coolant gas passage is disposed outside of a smallest circle that is inscribed along the linear section formed in said motor element and is concentric with said motor element.

2. The hermetic motor-driven compressor as set forth in claim 1, wherein the through hole constituting said second coolant gas passage is shaped like a bow, an outer periphery of the bow shape is like an arch that has a curvature larger than a curvature of the outer circumference of said motor element, and an inner periphery of the bow shape is like one of a line and an arc that has a radius larger than a radius of the inscribed circle.

3. The hermetic motor-driven compressor as set forth in claim 1, wherein a stator core is pressed into said hermetic container.

* * * * *